Figure 4:
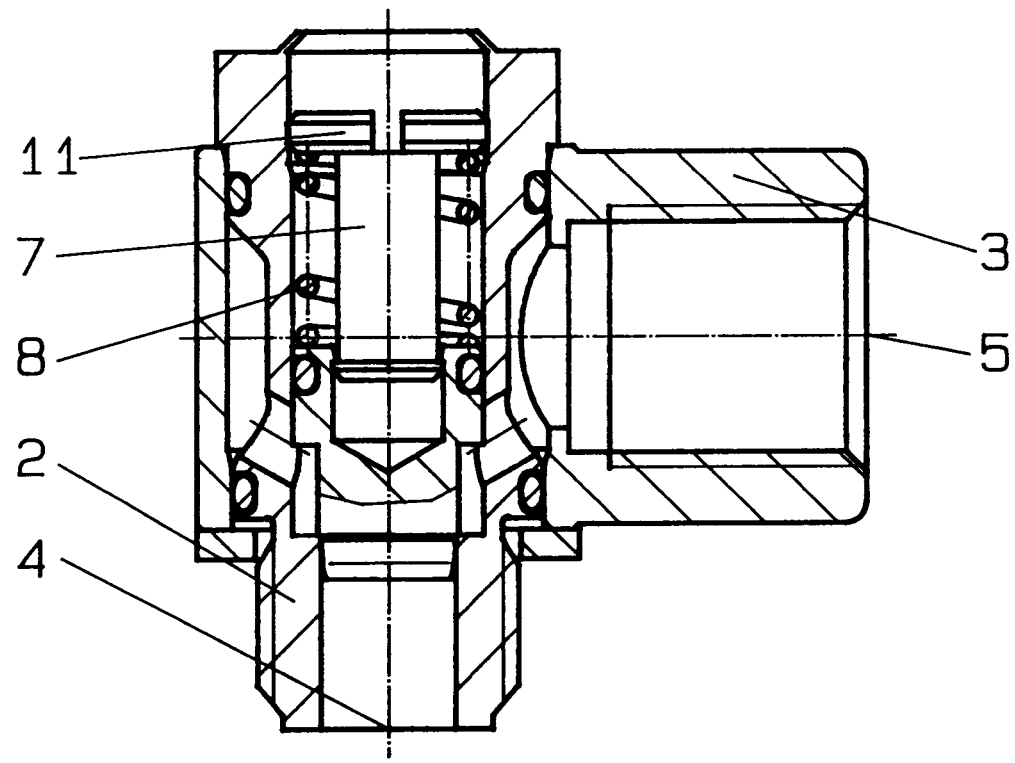

United States Patent [19]
Hidessen

[11] Patent Number: 5,918,623
[45] Date of Patent: Jul. 6, 1999

[54] STARTING VALVE

[75] Inventor: Ralf Hidessen, Hanover, Germany

[73] Assignee: Press Controls AG Rumlang, Rumland, Switzerland

[21] Appl. No.: 08/596,683

[22] Filed: Feb. 5, 1996

[30]     Foreign Application Priority Data

Feb. 28, 1995  [DE]  Germany ............................ 195 06 974

[51] Int. Cl.⁶ ...................................................... F16K 5/06
[52] U.S. Cl. ................... 137/269.5; 137/270; 137/513.5; 137/509; 137/538; 137/523; 251/83
[58] Field of Search ............................. 137/513.3, 513.5, 137/513.7, 509, 599.2, 522, 523, 538, 494, 514.5, 514.7, 270, 269.5; 251/83

[56]              References Cited

U.S. PATENT DOCUMENTS

| | | | |
|---|---|---|---|
| 778,015 | 12/1904 | Donnelly | 137/513.5 |
| 2,674,260 | 4/1954 | Thrush | 137/513.5 |
| 2,766,593 | 10/1956 | Mitchell | 137/509 |
| 3,181,561 | 5/1965 | Schaller | 137/513.5 |
| 3,200,830 | 8/1965 | Moyer | 137/513.5 |
| 3,595,265 | 7/1971 | Cryder | 137/513.5 |
| 3,623,509 | 11/1971 | Sesseler | 137/513.5 |
| 4,590,967 | 5/1986 | Schmitt | 137/509 |
| 4,901,978 | 2/1990 | Feild | 137/509 |
| 5,052,433 | 10/1991 | Levenez | 137/599.2 |
| 5,271,428 | 12/1993 | Dunn | 137/509 |

FOREIGN PATENT DOCUMENTS 1252024  12/1960  France ........................................ 251/83

*Primary Examiner*—Denise L. Ferensic
*Assistant Examiner*—Ramyar Farid
*Attorney, Agent, or Firm*—Reising, Ethington, Barnes, Kisselle, Learman & McCulloch, P.C.

[57]              ABSTRACT

The invention relates to a starting valve for progressive build-up of pressure in an installation through which pressure medium flows, comprising a housing with a first opening for coupling to a first component of the installation and a second opening for coupling to a second component of the installation, a channel connecting the two openings, a piston which is movable to and fro in the housing between a closed and an open position and has at least one first and one second pressure surface, wherein on the first pressure surface the pressure prevailing in the region of the first opening applies and on the second pressure surface the pressure prevailing in the region of the second opening applies, means for maintaining a low flow of pressure medium—while the piston is in the closed position—from one opening to the other, and a spring element which pushes the piston into the closed position. According to the invention all pressure surfaces have an action which pushes the piston into the open position.

16 Claims, 8 Drawing Sheets

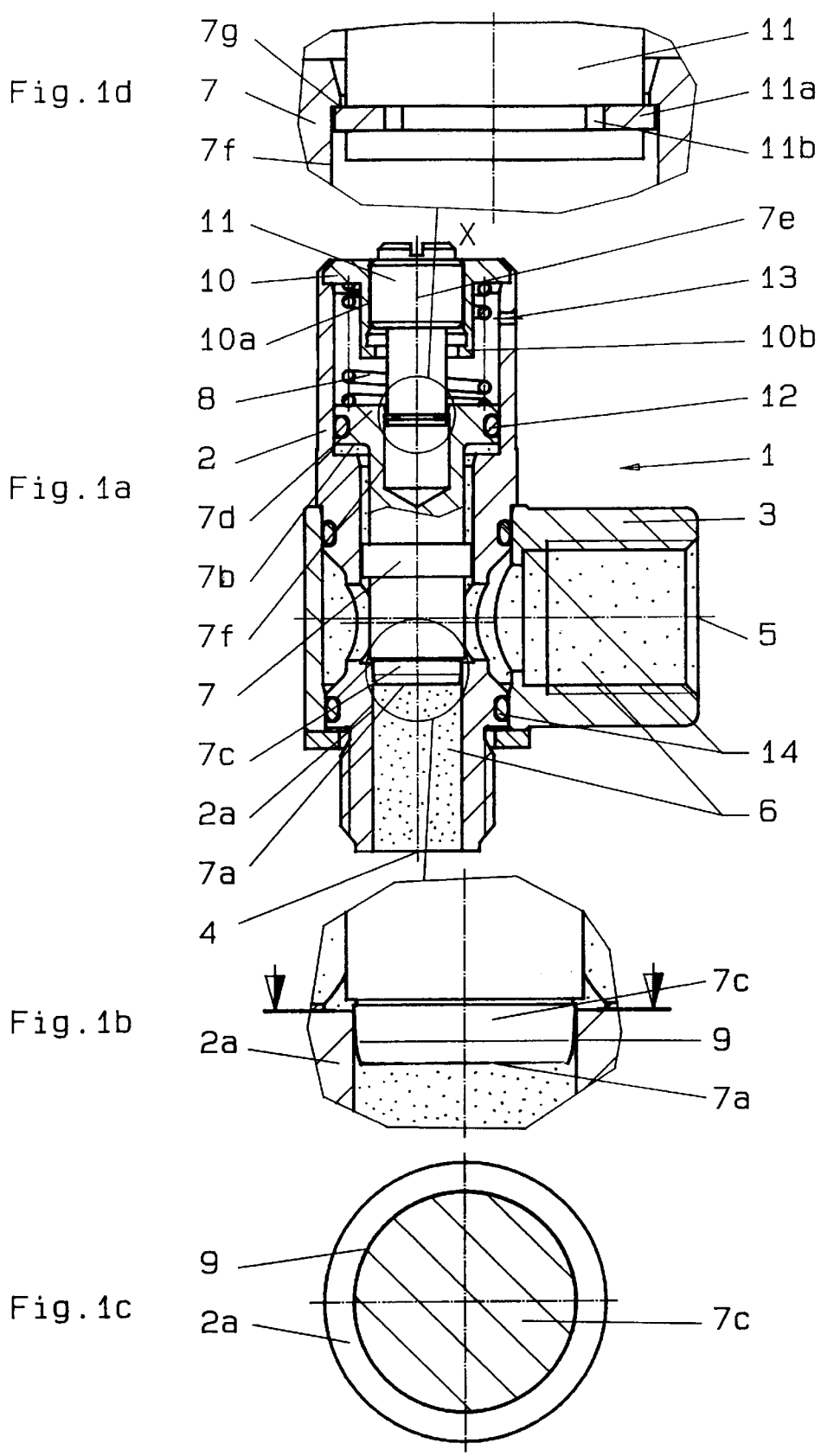

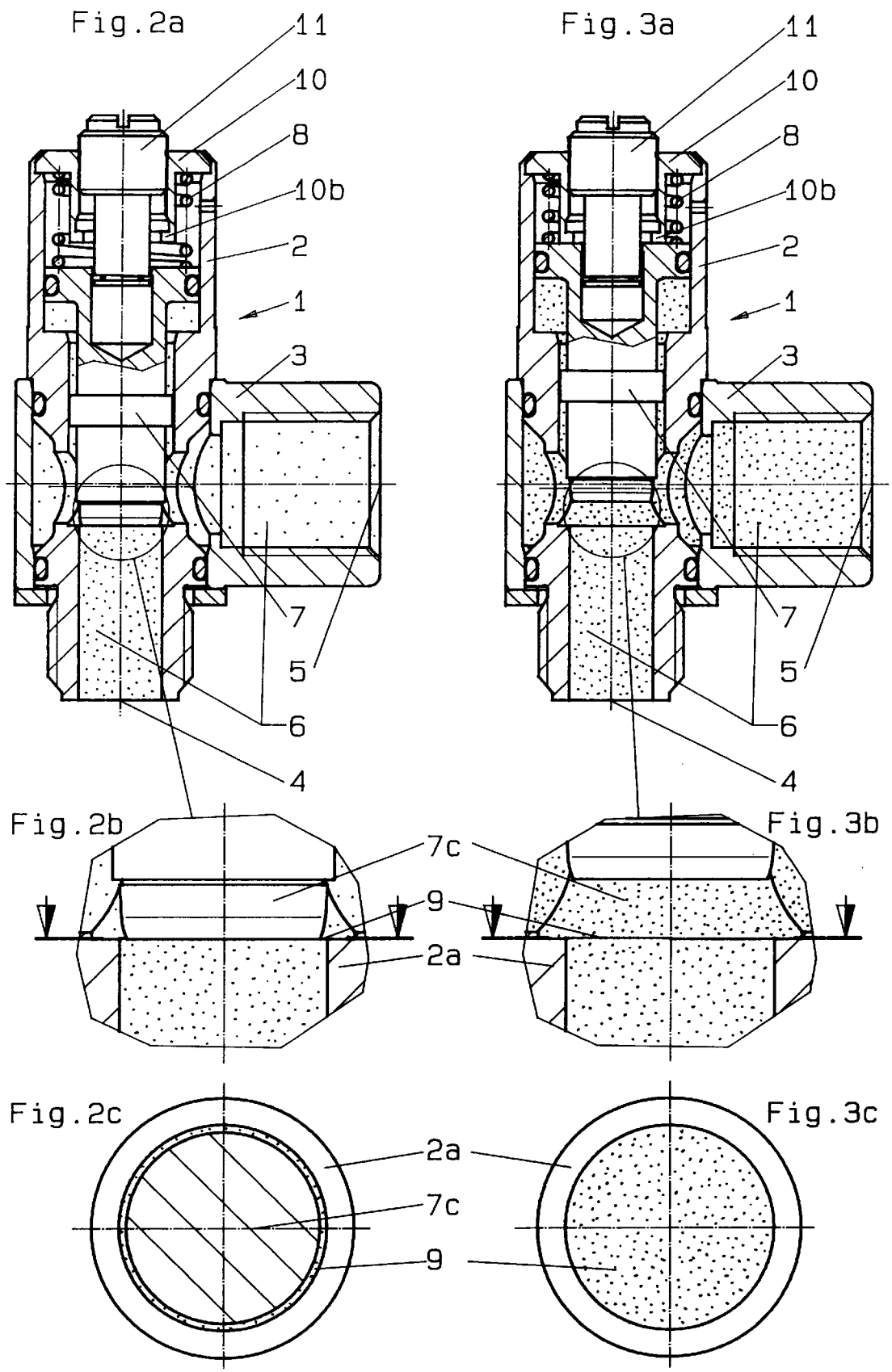

STARTING VALVE

The invention relates to a starting valve for progressive build-up of pressure in an installation through which pressure medium flows.

BACKGROUND OF THE INVENTION

When a compressed air installation which has previously been switched off and vented is switched on again, dangerous and damaging pressure surges can occur which lead to damage of cylinders arranged downstream. In order to prevent this, so-called starting valves for progressive build-up of pressure have been developed.

A starting valve of known construction is disclosed in EP-B-O 328 472 and comprises:
- a housing with a first opening for coupling to a first component of the installation and a second opening for coupling to a second component of the installation,
- a channel connecting the two openings,
- a piston which is movable to and fro in the housing between a closed and an open position and has at least one first and one second pressure surface, wherein on the first pressure surface the pressure prevailing in the region of the first opening applies and on the second pressure surface the pressure prevailing in the region of the second opening applies, and wherein one of the two pressure surfaces has a direction of action which pushes the piston into the open position and the other pressure surface has a direction of action which pushes the piston into the closed position,
- means for maintaining a low flow of pressure medium—while the piston is in the closed position—from one opening to the other,
- and a spring element which biases the piston toward the closed position.

In this known starting valve the first pressure surface which urges the piston toward the closed position is in communication with the first opening at which the high pressure applies, so that the piston is initially brought into the closed position. By way of a bypass duct, which is disposed for example in the piston, the high pressure gradually passes to the other side and there acts in connection with the second pressure surface for the purpose of opening the piston. Since the second pressure surface is larger in terms of surface area than the first pressure surface, after a certain equalisation of pressure the closing force emanating from the first pressure surface and the spring element is overcome, so that the piston moves slowly into the open position.

Due to the pressure surfaces acting in opposite directions, this starting valve can be used for a wide range of pressures.

However, the principle of this known starting valve only allows one direction of installation in an existing pneumatic installation, since the high pressure may only apply at the opening which is in communication with the pressure surface which pushes the piston into the closed position. Therefore for the second installation variant a starting valve of quite different construction is necessary.

SUMMARY OF THE INVENTION

The object of the known invention, therefore, is to make further developments to the starting valve in such a way that the disadvantages of the prior art are avoided and any installation of the starting valve is rendered possible.

This object is achieved according to the invention, in that pressure acting on all pressure surfaces have a direction of action which pushes the piston into the open position.

In a particularly advantageous embodiment the first and the second pressure surfaces are the same size, so that the same build-up of pressure occurs irrespective of the direction of installation. In this way it is possible to produce only one variant of the starting valve for both directions of installation. In addition to the economical manufacture, this also has the advantage of simplified storekeeping.

Further advantages and constructions of the invention are explained in greater detail in the description and in the drawings in relation to several embodiments.

THE DRAWINGS

Figure 5A:
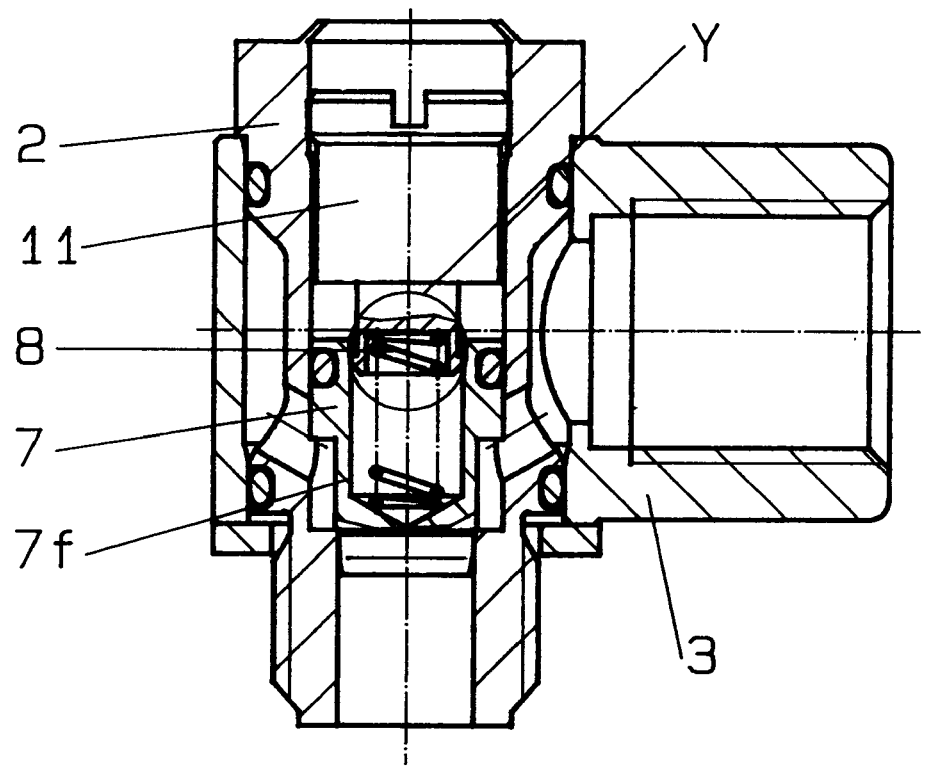
Figure 5B:
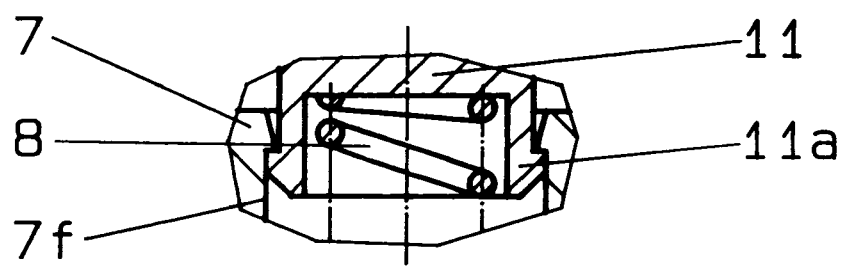
Figure 6:
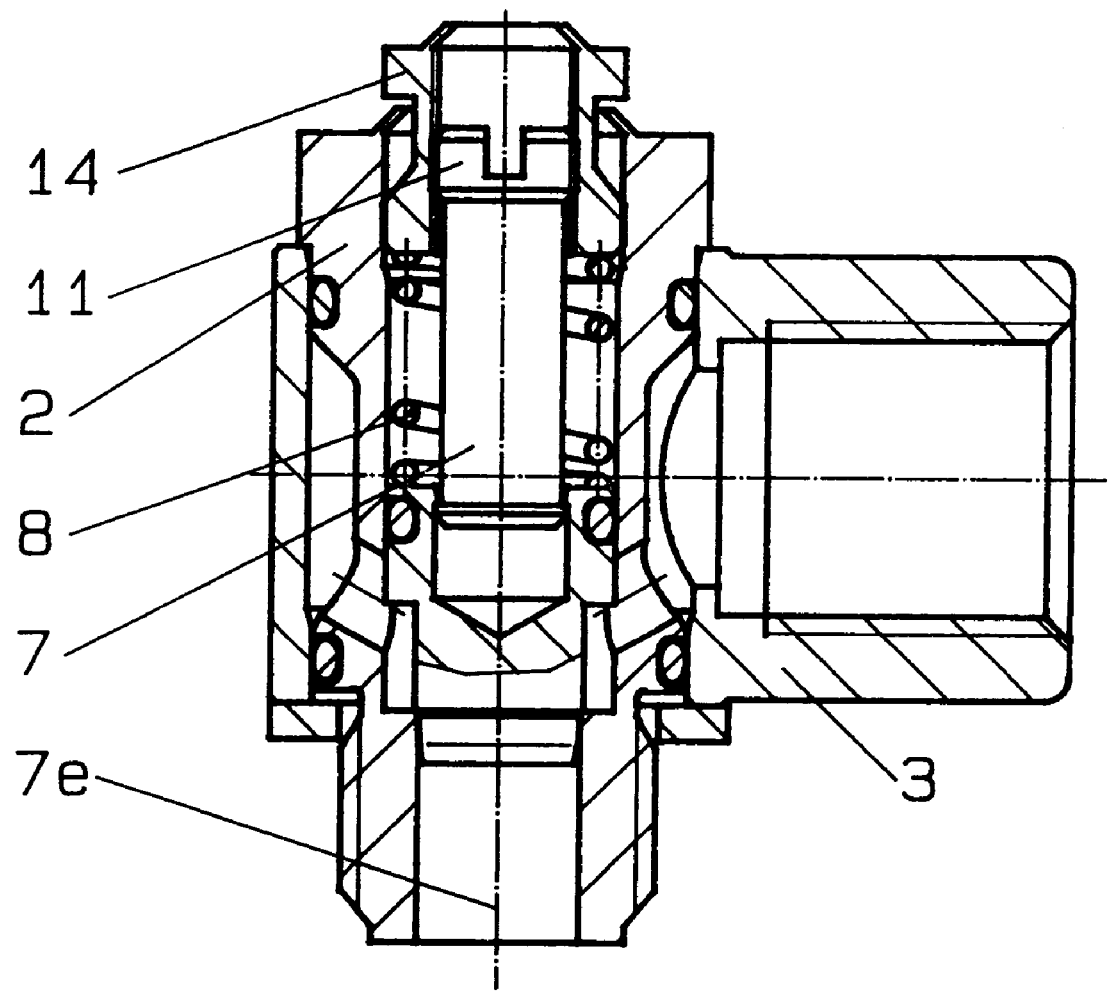
Figure 7:
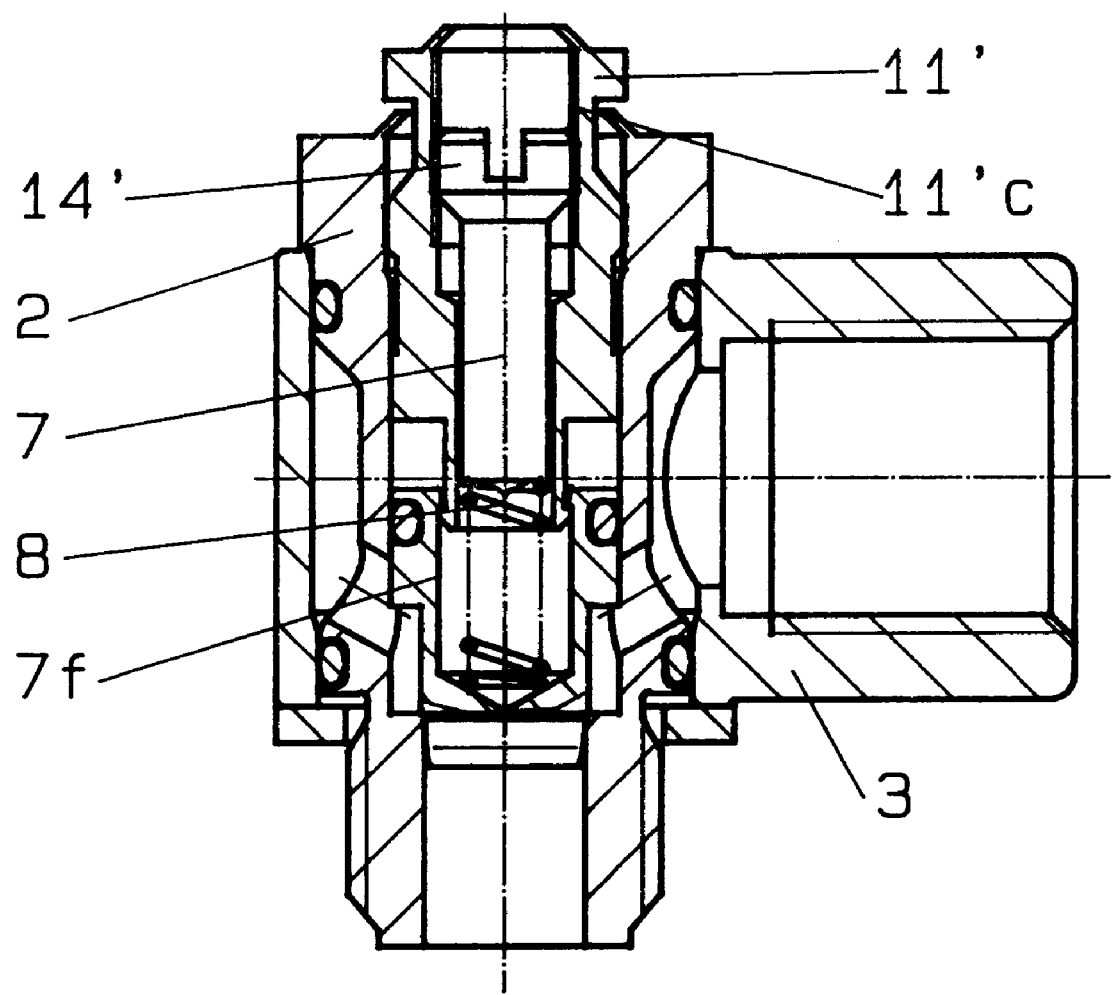
Figure 8A:
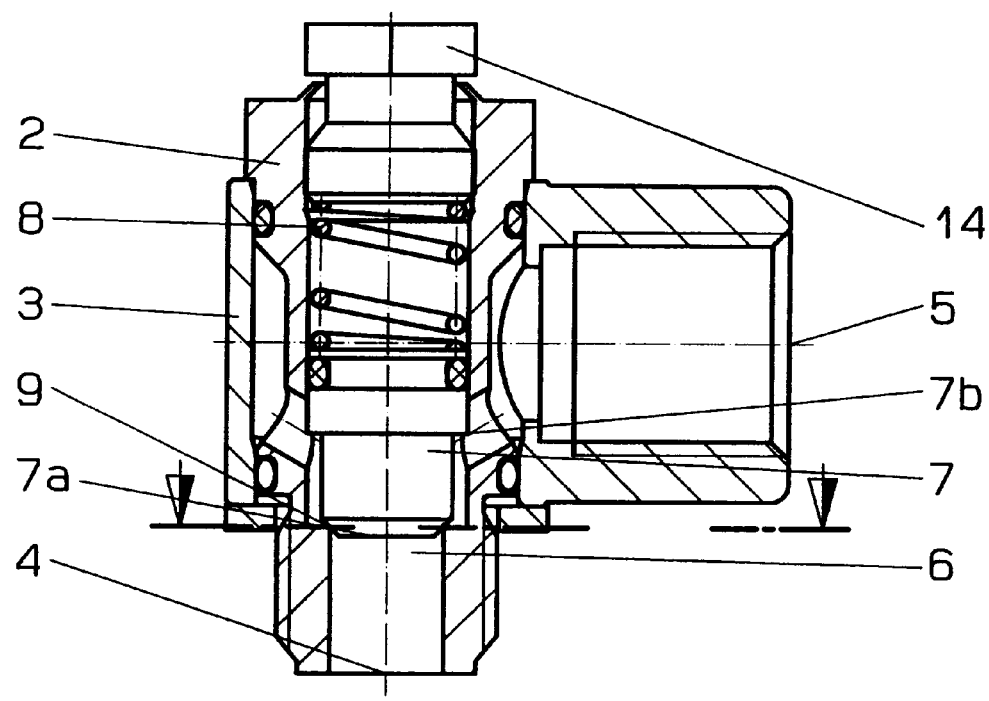
Figure 8B:
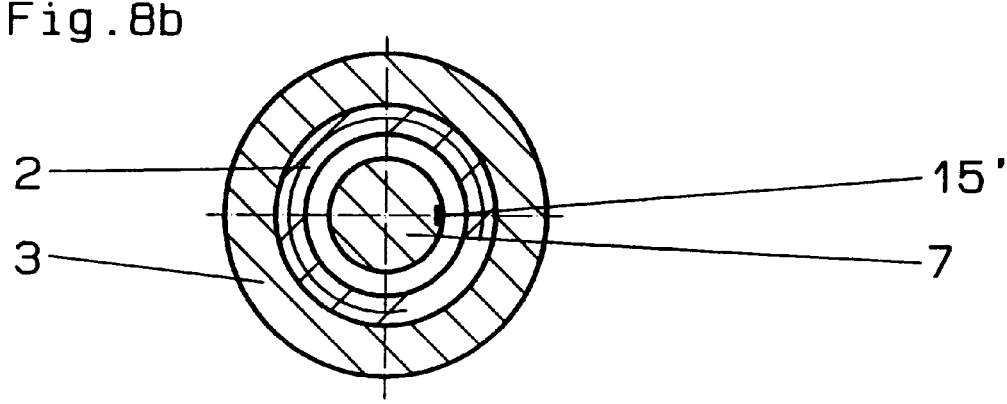
Figure 9A:
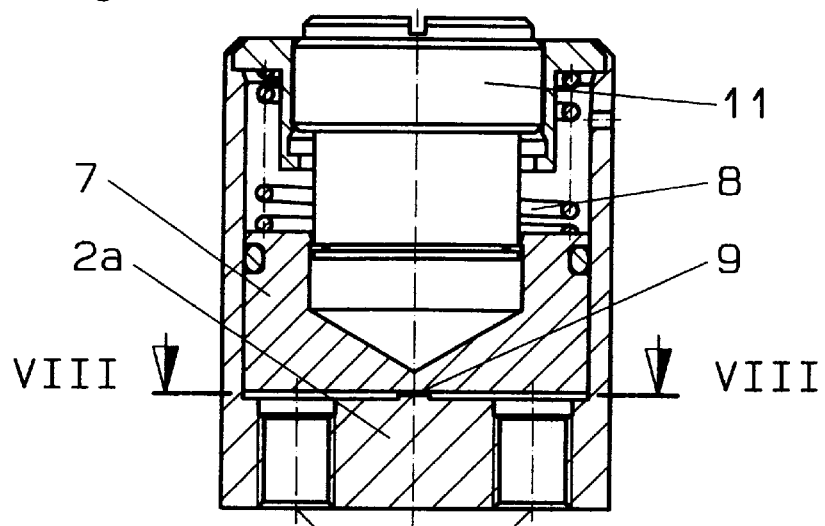
Figure 9B:
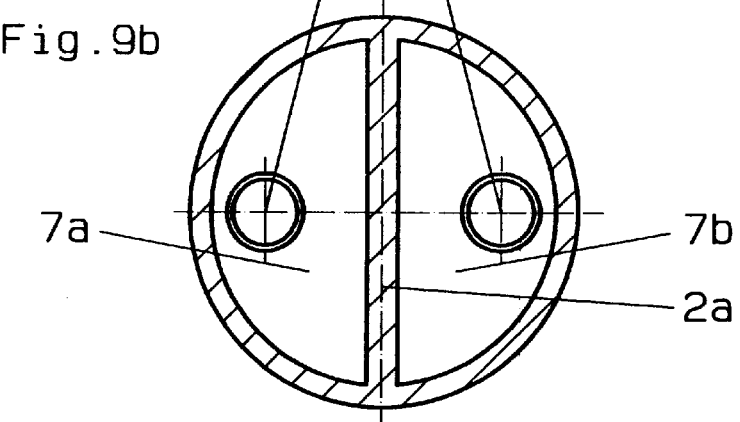
Figure 10:
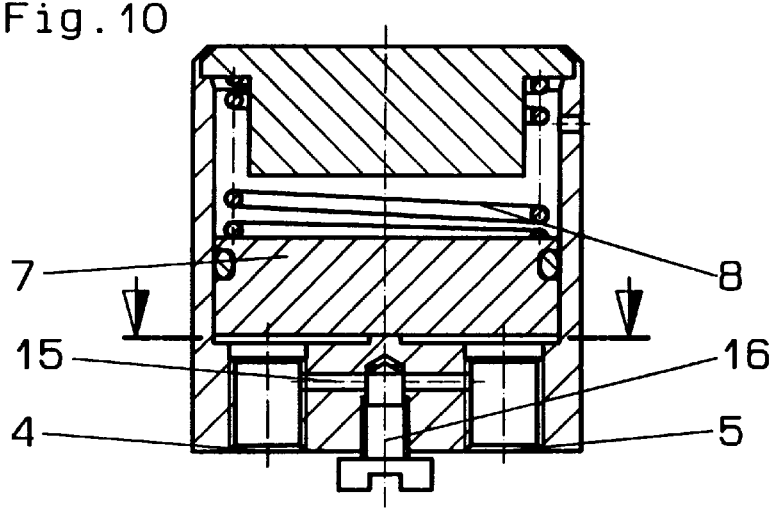

FIGS. 1a to 1d show sectional representations of a starting valve in the closed position of the piston, FIGS. 2a to 2c show sectional representations of the starting valve according to FIG. 1 in a middle position of the piston, FIGS. 3a to 3c show sectional representations of the starting valve according to FIG. 1 in the open position of the piston, FIG. 4 shows a sectional representation of the starting valve according to a second embodiment, FIGS. 5a, 5b show sectional representations of a starting valve according to a third embodiment, FIG. 6 shows a sectional representation of a starting valve according to a fourth embodiment, FIG. 7 shows a sectional representation of a starting valve according to a fifth embodiment, FIGS. 8a, 8b show sectional representations of a starting valve according to a sixth embodiment, FIGS. 9a, 9b show a sectional representation of a starting valve according to a seventh embodiment and FIG. 10 shows a sectional representation of a starting valve according to an eighth embodiment.

THE PREFERRED EMBODIMENTS

FIGS. 1a to 1d show a starting valve 1 according to a first embodiment, comprising a housing formed by a hollow screw 2 with attached ring fitting 3 and having a first opening 4 and a second opening 5, a channel 6 connecting the two openings, a piston 7 reciprocable in the housing and a spring element 8. The openings 4 and 5 serve to connect the valve 1 to two separate pressure sources, either one of which may be of greater value than that of the other.

The starting valve 1 is incorporated in an installation through which a pressure medium flows. The installation includes a first component C-1 coupled to and in communication with the first opening 4 and a second component C-2 coupled to and in communication with the second opening 5. One of the components C-1, C-2 may be the source of the pressure medium whereas the other component may be any suitable and conventional device operated by the pressurized medium. As will be explained hereinafter, either of the two components may be the source of the pressurized medium and, as a consequence, the pressurized medium may flow through the valve 1 in either one of two opposite directions.

The piston 7 has a first pressure surface 7a which is formed by that end face of the piston facing the first opening 4, so that on this first pressure surface 7a is acted on by the pressure prevailing in the region of the first opening. On the piston 7 there is further provided a second pressure surface 7b which is acted on by the pressure prevailing in the region of the second opening 5. This second pressure surface 7b is formed by an annular widening or enlargement of the piston in an end region 7d of the piston lying opposite the first pressure surface 7a.

The piston 7 is movable to and fro in the hollow screw 2 between a closed position illustrated in FIG. 1 and an open position illustrated in FIG. 3a. Furthermore, means are provided in order to maintain a low flow of pressure medium from one opening to the other opening also while the piston is in the closed position. These means are formed by a first end region 7c of the piston and a wall of the channel, see in particular FIG. 1b. The wall of the channel is formed in this case by the wall 2a of the hollow screw 2. A throttle opening 9 is constructed between the first end region 7c and the wall 2a. In FIGS. 1b, 2b and 3b as well as in FIGS. 1c, 2c and 3c the throttle opening 9 is illustrated in various positions of the piston 7, namely in the closed position in FIGS. 1b, 1c, in the middle position in FIGS. 2b, 2c and in the open position of the piston in FIGS. 3b, 3c.

In the second end region 7d the spring element 8 is in communication with the piston 7 and biases the piston toward its closed position. The spring element 8 is aligned coaxially with the central axis 7e of the piston and is supported on the one hand on the piston 7 and on the other hand on a closure element 10 which closes off the hollow screw 2. This closure element is for example pressed into the hollow screw and caulked.

An adjusting screw 11 is provided for adjustment of the size of the throttle opening 9 in the closed position of the piston 7. The central axis of the adjusting screw 11 advantageously coincides with the central axis 7e of the piston 7. The closure element 10 has a bore 10a which is provided with an internal thread in which the adjusting screw is led with a corresponding external thread. By the choice of a suitable thread pitch the adjusting screw can be precisely adjusted axially, i.e. in the direction of the central axis 7e of the piston, in proportion to the number of turns.

The detail of FIG. 1a characterised by X is shown on an enlarged scale in FIG. 1d which shows the connection of the piston 7 and the adjusting screw 11 in the closed position of the piston. In the second end region 7d of the piston a central bore 7f is provided into which the adjusting screw 11 protrudes during the movement of the piston into the open position, cf. FIGS. 2a and 3a. During operation the adjusting screw 11 is stationary, whilst the piston reciprocates relative thereto.

The throttle opening 9 is provided where the channel 6 of the hollow screw 2 merges into the ring fitting 3. In order to facilitate regulation of the size of the throttle opening 9 by axial displacement of the piston with the aid of the adjusting screw, the first end region 7c of the piston 7 is of conical construction.

For the following considerations, if the pressure which may be applying on the pressure surfaces 7a, 7b is disregarded, then the piston is pushed by the spring element 8 into its closed position. The size of the annular throttle opening 9 is determined by the axial position of the piston 7. In order to fix the smallest throttle opening, the bore 7f is provided in the region of its opening with a projecting shoulder 7g which comes to a stop with a counterpart 11a on the adjusting screw 11 in the closed position of the piston. This counterpart 11a is formed for example by a circlip which is retained in a corresponding groove 11b on the lower end of the adjusting screw 11. If the throttle opening 9—in the closed position of the piston—is to be enlarged, then this takes place by turning of the adjusting screw 11 in the corresponding direction, so that the piston 7 is drawn along over its shoulder 7g and the counterpart 11a. The adjusting screw 11 is correspondingly constructed for the adjustment in that it has, for example, a longitudinal slot for actuation with a screwdriver.

The end 10b of the closure element 10 facing the piston 7 serves in the open position according to FIG. 3a as an upper stop for the piston.

In the region of the adjusting screw 11 the substantially cylindrical hollow screw is adapted in diameter to the annular widening of the piston. Between the hollow screw 2 and the piston 7 a seal 12 is provided in the region of the annular widening. In order during movement of the piston to ensure an equalisation of pressure in the space located above the piston, a corresponding air vent 13 is provided in the wall of the hollow screw 2. The ring fitting 3 is also coupled to the hollow screw 2 by way of suitable seals 14.

The way in which the starting valve according to the invention functions is explained in greater detail below:

After incorporation of the starting valve into a corresponding installation the size of the throttle opening in the closed position of the piston is adjusted by turning the adjusting screw 11. In this case the size of the throttle opening depends upon the volume of the connections through which pressure medium flows which lie downstream of the valve. This means that with a small volume a correspondingly small throttle opening can be set.

At the beginning of the starting operation, the piston 7 is located in its closed position according to FIG. 1. If for example, the component C-1 is the pressure medium source, the relatively high supply pressure $P_V$ will prevail at the first opening 4 as a consequence of which a first force $F_1$ acts on the first pressure surface $7_a$ of the piston 7 and such force corresponds to the condition then because of the first pressure surface 7a a force $F_1$ acts on the piston 7, this force corresponding to the condition $$F_1 = P_V * A_1$$

where $A_1$ corresponds to the size of the first pressure surface 7a.

At this time a useful pressure $P_N$ which is substantially lower than the supply pressure $P_V$ prevails at the second opening 5. Consequently this useful pressure $P_N$ also applies on the second pressure surface 7b, where it produces a force $F_2$ which satisfies the condition $$F_2 = P_N * A_2$$

where $A_2$ corresponds to the size of the second pressure surface 7b. Both the force $F_1$ and the force $F_2$ have a direction of action which pushes the piston 7 into its open position. Only the force $F_F$ of the spring element 8 acts against these two forces.

The spring force $F_F$ must be so great that the force $F_1$ by itself is not sufficient to move the piston into the open position. However, by way of the throttle opening 9 the pressure gradually passes from the first opening 4 to the second opening 5, so that the useful pressure $P_N$ gradually increases. The force pushing the piston into the open position increases in a proportional manner. After an equilibrium of the forces $F_1$ and $F_2$ on the one hand and the force $F_F$ on the other hand has been reached, with a further increase in the useful pressure $P_N$ a displacement of the piston into the open position begins.

Therefore in order to ensure the functioning of the starting valve the following condition must be satisfied:

$$P_V * (A_1 + A_2) > F_F$$

When the piston 7 is located in its open position, the starting process is concluded and the condition $$P_V = P_N$$

applies.

The size of the two pressure surfaces 7a, 7b, i.e. $A_1$ and $A_2$, is preferably chosen to be the same. Disregarding any frictional forces, the starting valve then also functions in an analogous manner if the supply pressure $P_V$ should apply at the second opening 5. Thus, depending upon the application, the starting valve can be incorporated with its first opening 4 upstream or downstream in the installation through which pressure medium flows.

The starting valve can be used in connection with the most varied pressure mediums, such as for example air or oil.

Further embodiments of the starting valve according to the invention are described below in relation to FIGS. 4 to 9, where corresponding reference numerals are used for parts having the same function. Since the way in which the further embodiments are constructed and function is for the most part comparable with the first embodiment according to FIGS. 1 to 3, only the differences will be considered in greater detail below.

In FIG. 4 a second embodiment is described which differs from the starting valve according to FIG. 1 essentially only in the region of the adjusting screw. In this embodiment the closure element is omitted, so that the adjusting screw 11 is adjustable by way of an internal thread provided on the hollow screw 2. The adjusting screw 11 serves simultaneously as an abutment for the spring element 8.

This embodiment is distinguished over the embodiment according to FIGS. 1 to 3 by a a reduced number of components.

In the third embodiment illustrated in FIGS. 5a, 5b the adjusting screw 11 is again guided directly in the hollow screw 2. However, the spring element 8 is not disposed coaxially around the adjusting screw 11 but rather in the bore 7f of the piston 7. In this case the spring element 8 is supported on the one hand on the base of the bore 7f and on the other hand on the lower end of the adjusting screw 11. In this embodiment, too, the spring element 8 presses the piston into its closed position.

The detail Y shown in FIG. 5a is shown on an enlarged scale in FIG. 5b and illustrates a further variant for the stop for the piston in the closed position. The counterpart 11a of the adjusting screw 11 is constructed here not as a circlip but as a snap hook.

The fourth embodiment according to FIG. 6 corresponds substantially to that of FIGS. 1 to 3, the closure element 10 being constructed as a pressure adjusting screw 14 which is adjustable in the direction of the central axis 7e. For this purpose the part of the pressure adjusting screw 2 projecting out of the hollow screw 2 has for example a hexagonal shape.

The spring force in the closed position of the piston can be altered by the axial adjustment of the pressure adjusting screw in order to adjust the spring force optimally to the supply pressure. Since the adjustment of the pressure adjusting screw 14 also effects an adjustment of the adjusting screw 11 in direct proportion, it is always necessary first of all for the spring pressure to be varied by way of the pressure adjusting screw 14 and then for the throttle opening to be varied by way of the adjusting screw 11.

In FIG. 7 a fifth embodiment is illustrated which essentially represents a combination of the embodiments according to FIGS. 5 and 6. In this case the adjusting screw 11' for the throttle opening is guided in the hollow screw 2 with the aid of an internal thread. Furthermore, a pressure adjusting screw 14' is retained in a central bore 11'c in a threaded guide. The axial adjustment of the pressure adjusting screw 14' effects an alteration in the length of the spring element disposed in the bore 7f.

For the adjustment of this screw connection, first of all the pressure of the spring element or the size of the throttle opening can be altered as desired.

In the sixth embodiment illustrated in FIGS. 8a and 8b the regulation of the starting process is carried out exclusively by way of a pressure adjustment. As in the embodiments according to FIGS. 6 and 7 the opening pressure can be fixed by the alteration of the pressure of the spring element 8 by means of the pressure adjusting screw 14. If the pressure of the spring element 8 is increased the piston 7 will move more slowly than if the initial tension is lower. In this way the starting valve can be adjusted individually for each application.

In this embodiment, in the closed position the piston 7 closes off the usual communication between the first and second openings 4, 5. The means for maintaining a low flow of pressure medium while the piston is in the closed position are formed here by a groove 15' in the piston, the flow cross-section of which is fixed and therefore not adjustable.

The seventh embodiment illustrated in FIGS. 9a and 9b differs from all the preceding embodiments in that the two parts 6 of the channel are disposed not at right angles but parallel to one another. In the illustrated section according to FIG. 9b along the line VIII—VIII of FIG. 9a the two pressure surfaces 7a and 7b can be seen. The throttle opening 9 is determined by the gap forming between the piston 7 and the wall 2a of the housing. The adjustment of the throttle gap 9 takes place according to one of the variants described above.

FIG. 10 shows an eighth embodiment which differs from the embodiment according to FIGS. 9a, 9b only by the construction of the throttle gap. In this embodiment the piston 7 closes off the usual communication between the first and second openings 4, 5. The means for maintaining a low flow of pressure medium while the piston is in the closed position are formed here by a bypass duct 15, the flow cross-section of which can be varied by an adjusting screw 16.

However, it is a common feature of all the embodiments that when pressure is applied the two pressure surfaces 7a, 7b constructed on the piston 7 act for the purpose of opening and only the spring element 8 acts for the purpose of closing the piston. Because the two pressure surfaces are constructed with the same size, the starting valve can be connected as desired with its first or second opening 4, 5 to the supply pressure.

I claim:

1. In a fluid pressure installation having a starting valve interposed between and in communication with each of first and second pressure components for controlling the build-up of pressure in said installation, one of said components at the commencement of the build-up of pressure in said installation having a higher pressure than the other of said components and wherein the starting valve is operable at the commencement of pressure build-up in said installation to enable a gradually increasing flow of pressure fluid from said one of said components to the other of said components, the improvement wherein said starting valve comprises:

a) a housing having a first pressure medium opening in communication with said one of said components and a second pressure medium opening spaced from said first opening in communication with said other of said components;

b) a pressure medium flow channel in said housing communicating with both of said first and second openings and through which said pressure medium may flow from either one of said openings to the other;

c) a piston mounted in said channel for movement from a closed position in which the flow of pressure fluid through said channel is relatively restricted to an open position in which the flow of pressure fluid through said channel is relatively unrestricted, said piston having a first pressure surface in communication with said first opening and a second pressure surface equal in area to that of said first pressure surface and in communication with said second opening, the pressure prevailing at said first opening being operable at all times to generate a first force on the piston via said first pressure surface, and the pressure prevailing at said second opening being operable at all times to generate a second force on said piston via said second pressure surface, both of said first and second pressure surfaces having a direction of action which urges the piston toward said open position;

d) spring means biasing said piston toward said closed position, said spring means having a biasing force greater than the sum of said first and second forces at the commencement of pressure build-up in said installation and while said piston is in said closed position; and e) throttle means for enabling a flow of pressure medium through said channel while said piston is in said closed position and in a direction from the opening having the higher prevailing pressure to the opening having the lower prevailing pressure regardless of which of said openings has the higher prevailing pressure, thereby causing the lower prevailing pressure gradually to increase and gradually increase the sum of the first and second force until the sum of said first and second forces exceeds the biasing force of said spring means and effects movement of the piston to said open position, f) the equality of the areas of said pressure surfaces enabling movement of said piston from said closed position toward said open position in response to the same pressure build-up regardless of whether the pressure medium flows from said first opening toward said second opening or vice versa.

2. The construction according to claim 1 wherein said throttle means comprises a first end region of the piston, a wall of the channel, and a throttle opening between the end region of the piston and said wall.

3. The construction according to claim 2 including means for adjusting the size of the throttle opening in the closed position of the piston.

4. The construction according to claim 3 wherein the adjusting means includes an adjusting screw for limiting movement of the piston in a direction toward said closed position.

5. The construction according to claim 4 wherein the piston is movable relative to said adjusting screw.

6. The construction according to claim 4 wherein the piston and the adjusting screw have a common central axis.

7. The construction according to claim 4 wherein said spring means is coaxial with the adjusting screw.

8. The construction according to claim 4 wherein a second end region of the piston has a central bore into which the adjusting screw protrudes during movement of the piston toward said open position.

9. The construction according to claim 8 wherein said central bore has a projecting shoulder which forms a stop for the adjusting screw in the closed position of the piston.

10. The construction according to claim 6 wherein the adjusting screw is adjustable longitudinally of the central bore for controlling the size of the throttle opening.

11. The construction according to claim 1 wherein the first pressure surface is formed by an end face of the piston and the second pressure surface is formed by a surface of an annular enlargement of the piston.

12. The construction according to claim 2 wherein the piston is of conical configuration in the first end region.

13. The construction according to claim 1 wherein said housing is formed by a hollow screw having an attached ring fitting, said piston and said first opening being in the hollow screw and said second opening being in the ring fitting.

14. The construction according to claim 13 wherein said channel is substantially right angular.

15. The construction according to claim 1 including means for adjusting the bias of said spring means.

16. The construction according to claim 15 wherein the means for adjusting the bias comprises a pressure adjusting screw guided in the housing and in contact with said spring means at that end thereof opposite the piston.

* * * * *